(12) United States Patent
Sturza et al.

(10) Patent No.: US 12,492,747 B1
(45) Date of Patent: Dec. 9, 2025

(54) PARK RELEASE MECHANISM WITH DEPLOYABLE HANDLE AND INDICATOR

(71) Applicant: FCA US LLC, Auburn Hills, MI (US)

(72) Inventors: Brian P Sturza, Washington, MI (US); Dorinel Neag, Commerce Township, MI (US); Carl Mather, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/341,387

(22) Filed: Jun. 26, 2023

(51) Int. Cl.
*F16H 61/36* (2006.01)
*F16H 59/02* (2006.01)
*F16H 63/34* (2006.01)

(52) U.S. Cl.
CPC ......... *F16H 61/36* (2013.01); *F16H 63/3433* (2013.01); *F16H 2059/026* (2013.01)

(58) Field of Classification Search
CPC .. F16H 61/36; F16H 63/3433; F16H 63/3491; F16H 2059/026
USPC ...... 74/473.15, 473.3, 501.6, 502, 491, 503, 74/509, 145, 160, 602.2, 546, 553, 554
See application file for complete search history.

(56) References Cited

U.S. PATENT DOCUMENTS

2014/0311269 A1* 10/2014 Fournier ............. F16H 59/0278
74/473.3

FOREIGN PATENT DOCUMENTS

| KR | 2011062879 A | * | 6/2011 | ......... F16H 63/3466 |
| WO | WO-2013079182 A1 | * | 6/2013 | ............ B60W 10/11 |

* cited by examiner

*Primary Examiner* — T. Scott Fix
(74) *Attorney, Agent, or Firm* — Jeremy J. Klobucar

(57) ABSTRACT

A manual park release assembly includes a housing extending along a longitudinal axis between a first end and a second end, and a handle disposed at least partially in the housing. The handle is deployable relative to the housing along the longitudinal axis between a stored position and a deployed position, and the handle is rotatable relative to the longitudinal axis when the handle is in the deployed position. The manual park release assembly further includes an actuator having a first portion coupled to the handle for rotation with the handle and a second portion coupled to the first portion and movable axially in response to rotation of the first portion.

18 Claims, 7 Drawing Sheets

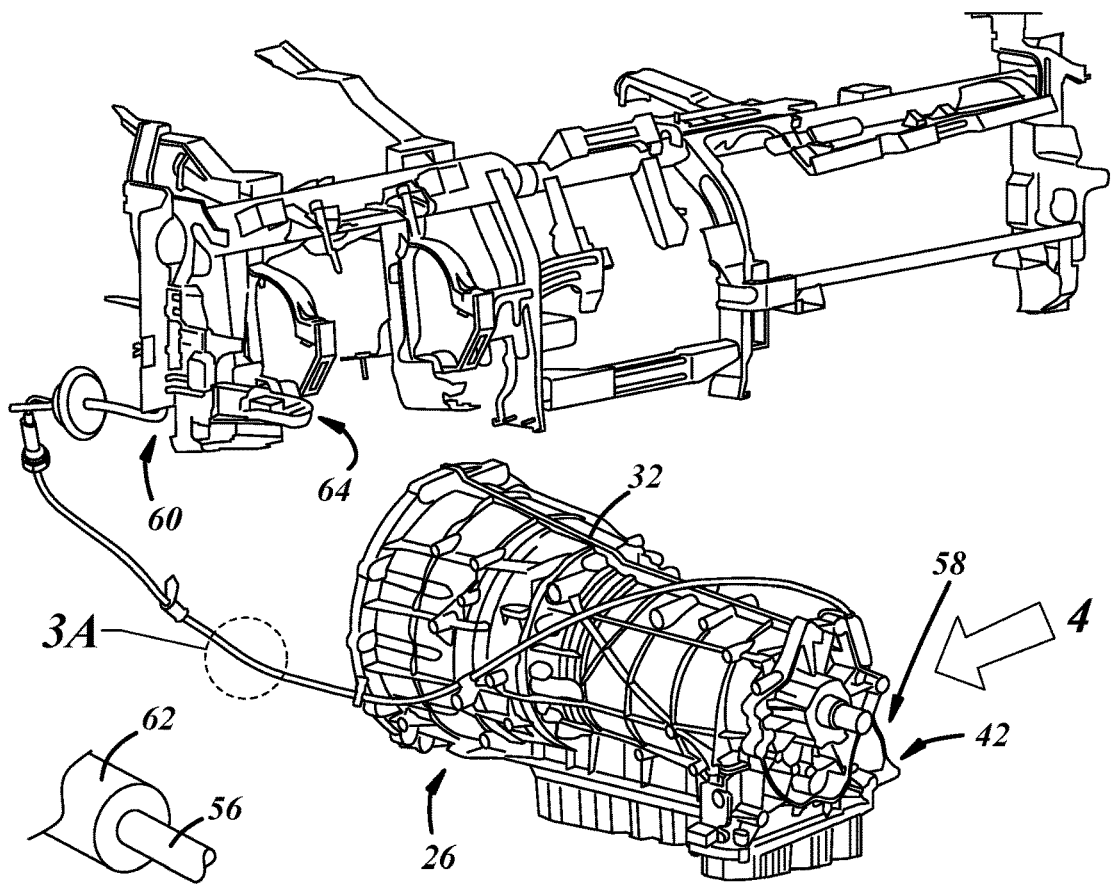
FIG. 3A
FIG. 3
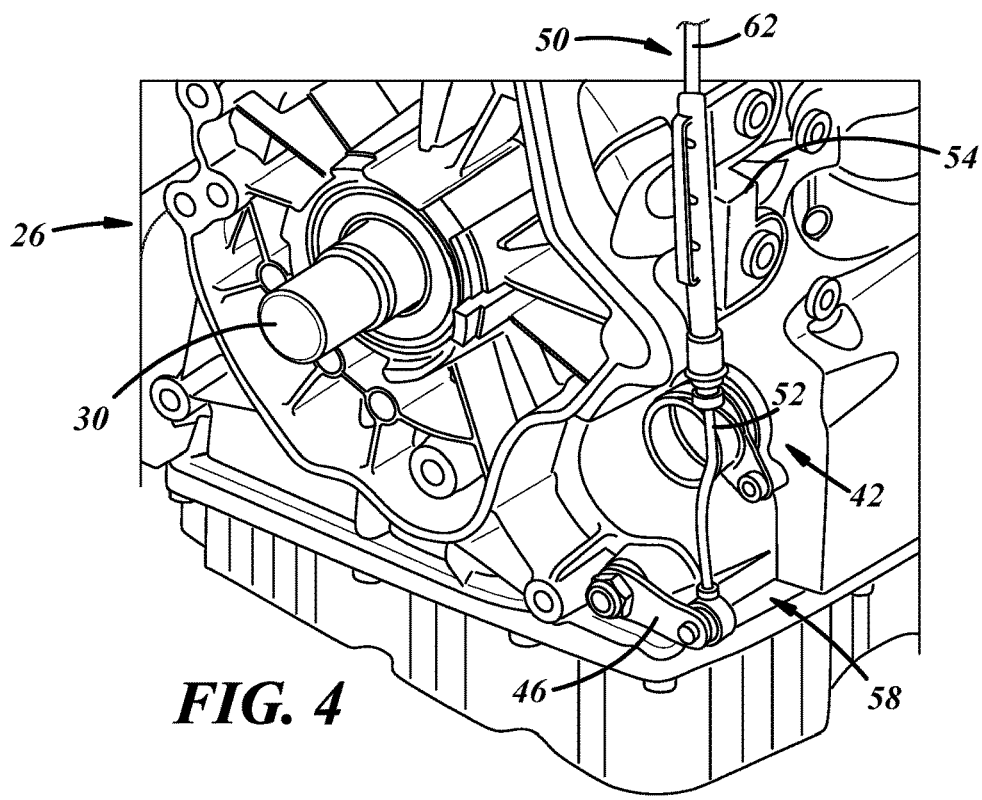
FIG. 4

PARK RELEASE MECHANISM WITH DEPLOYABLE HANDLE AND INDICATOR

FIELD

The present disclosure relates to a park release mechanism with a deployable handle and an indicator.

BACKGROUND

Vehicles include powertrain components that are electronically and/or hydraulically controlled such as an internal combustion engine and an automatic transmission. Engines provide power (i.e., torque) and the transmission transfers the power to a driveline to drive a set of wheels at a selected gear ratio. The transmission typically includes one or more operating modes such as Park, Neutral, Reverse, and Drive. It may be desirable to be able to switch the operating mode of the transmission while the engine is not producing power. Some vehicles are equipped with an emergency manual park release that allows a user to, with one or more tools, shift the vehicle into neutral so that the vehicle may be towed, for example.

SUMMARY

In at least some implementations, a manual park release assembly includes a housing extending along a longitudinal axis between a first end and a second end, and a handle disposed at least partially in the housing. The handle is deployable relative to the housing along the longitudinal axis between a stored position and a deployed position, and the handle is rotatable relative to the longitudinal axis when the handle is in the deployed position. The manual park release assembly further includes an actuator having a first portion coupled to the handle for rotation with the handle and a second portion coupled to the first portion and movable axially in response to rotation of the first portion.

In at least some implementations, the handle further comprises an inner member and an outer member that is slidable relative to the inner member.

In at least some implementations, the handle is in the deployed position, the inner member and outer member rotate together.

In at least some implementations, the inner member includes pins that extend outwardly and orthogonally to the longitudinal axis, and the outer member includes channels into or through which the pins extend.

In at least some implementations, the first portion of the actuator is a threaded shaft and the second portion is a nut which is threaded on the threaded shaft.

In at least some implementations, the portion of the housing in which the nut is received and the nut are not circular, and each of said portion of the housing and the nut include at least one flat surface the interaction of which prevent rotation of the nut within the housing and guide the nut for linear movement along the threaded shaft.

In at least some implementations, the handle is deployed and rotated in a first direction about the longitudinal axis, the first portion of the actuator rotates relative to the second portion of the actuator which moves toward the second end of the housing.

In at least some implementations, the handle is deployed and rotated in a second direction about the longitudinal axis, the second portion of the actuator moves axially along the first portion of the actuator and toward the first end of the housing.

In at least some implementations, the manual park release further comprises an indicator including a rear end coupled to the second portion of the actuator and a front end extending longitudinally to the second end of the housing, wherein when the handle is in the deployed position and rotated in a first direction about the longitudinal axis the indicator is driven axially and increasingly protrudes out of the second end of the housing.

In at least some implementations, a vehicle includes a vehicle body and a transmission coupled to the vehicle body. The transmission including a shift lever that is driven to change the gear setting of the transmission. The vehicle further including a housing coupled to the vehicle body and having a longitudinal axis and a handle at least partially disposed in the housing and rotatable about the longitudinal axis. The vehicle further including an actuator disposed in the housing. The actuator having a first portion coupled to the handle for rotation with the handle and a second portion coupled to the first portion and movable axially in response to rotation of the first portion. The vehicle further including a cable connected to the second portion of the actuator and to the shift lever so that movement of the second portion of the actuator is transmitted to the shift lever via the cable, to move the shift lever.

In at least some implementations, the housing is made of a rigid or semi-rigid material and is coupled to the vehicle body by a bracket.

In at least some implementations, the housing and the bracket are connected to a support structure for a vehicle instrument panel.

In at least some implementations, the housing further includes a handle dock and the handle includes an enlarged handle end that is received in the handle dock when the handle is in the stored position.

In at least some implementations, the handle includes a collapsible lever coupled to the handle and is configured to be stored at least partially within the housing in the stored position.

In at least some implementations, the cable includes a wire that has a first end and a second end, and that is received within a conduit that extends at least part of the distance between the first end and the second end.

In at least some implementations, the first end of the wire is directly coupled to the shift lever and the second end of the wire is coupled to the second portion of the actuator.

In at least some implementations, the vehicle further includes an indicator including a rear end coupled to the second portion of the actuator and a front end extending longitudinally through the housing, wherein when the handle is in the deployed position and rotated in a first direction about the longitudinal axis the indicator is driven axially along the longitudinal axis and increasingly protrudes out of the housing.

The manual park release assembly includes a stowable handle that, when deployed, can be rotated to cause movement of a transmission actuator. The assembly may be used to move a park lever or pawl out of a park position to permit a vehicle to be moved when the vehicle cannot normally be shifted out of part. This may occur, for example, when electrical power is lost in the vehicle. In such instances, the disabled vehicle may need to be moved, for example, so it can be towed, and being able to shift the transmission out of park can facilitate moving or towing the disabled vehicle.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 3 is a perspective view showing the park release assembly coupled to the vehicle body and to a shift lever assembly that is coupled to the transmission;

FIG. 3A is a cross-sectional perspective view of a cable connected to the park release assembly shown in FIG. 3;

FIG. 4 is an enlarged, fragmentary perspective view of the shift lever assembly coupled to the transmission;

DETAILED DESCRIPTION

Figure 1:
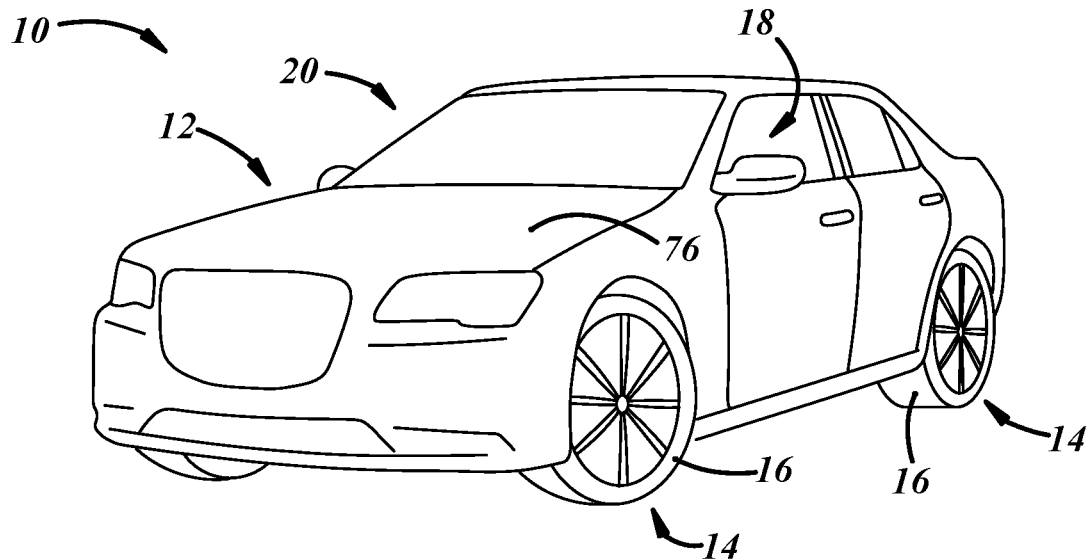
FIG. 1 is a perspective view of a vehicle.

Referring in more detail to the drawings, FIG. 1 shows a schematic illustration of a vehicle 10. The vehicle 10 includes a vehicle body 12 and wheels 14 coupled to the vehicle body. Each wheel is coupled to a tire 16. The vehicle body 12 further includes a vehicle frame and structural members (e.g., A-pillar, B-pillar, C-pillar, etc.) for mounting various vehicle components like doors, windows, a dashboard, and the like. The vehicle body defines a passenger compartment 18 that includes a driver's side and passenger side and a vehicle exterior 20.

Figure 2:
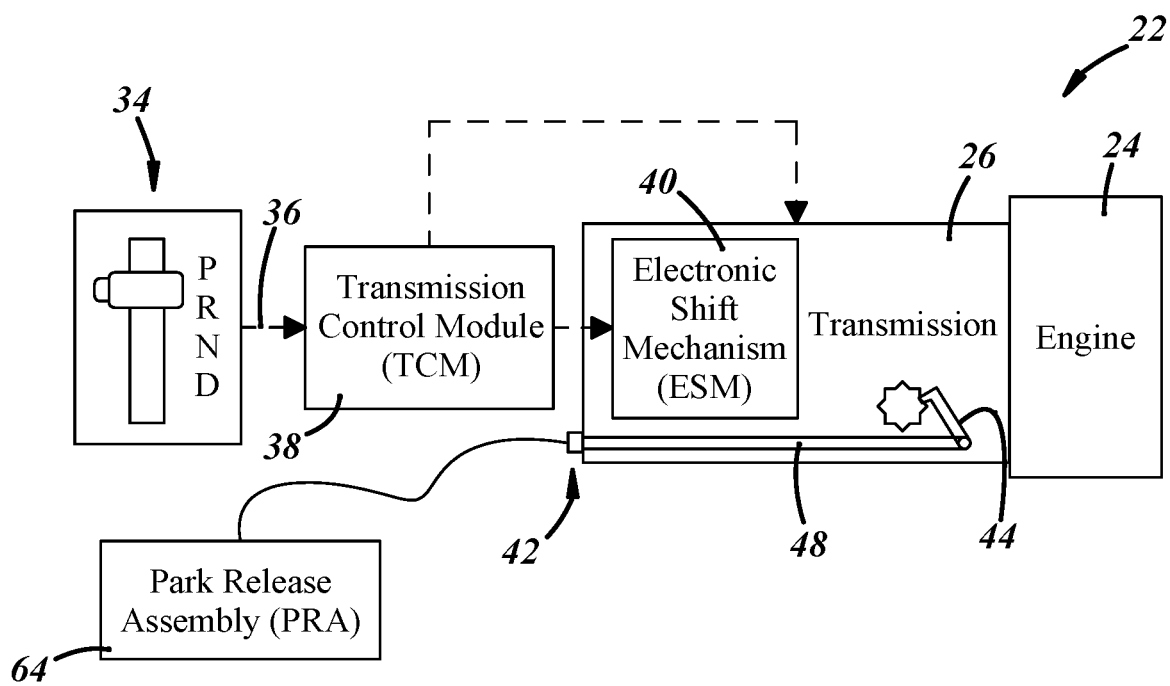
FIG. 2 is a schematic view of a partial powertrain of the vehicle shown in FIG. 1, comprising an engine, a transmission, and a park release assembly.

FIG. 2 provides a schematic illustration of the powertrain 22 which includes an engine 24, such as an internal combustion engine, and an automatic transmission 26 coupled to the engine 24. The engine 24 produces torque that is transferred through the transmission 26 at varying gear ratios to drive wheels 14 (FIG. 1) of the vehicle 10. The transmission 26 also includes a housing 32 (FIG. 3), and a park gear 28 which helps maintain the vehicle 10 stationary by preventing rotation of an output shaft 30 (FIG. 4) of the transmission 26. A user interface 34 including a lever, dial, switches, buttons, or any other type of input interface is provided in the passenger compartment 18 and can be actuated to select a transmission mode such as Park, Reverse, Neutral, and Drive (PRND). FIG. 2 schematically shows the system which begins with the user interface 34 that sends a control signal 36 to a transmission control module 38 (TCM) based on the selected operating mode of the transmission 26. An electronic shift mechanism 40 (ESM) may be an integral part of the transmission 26 and receives the control signal 36 from the TCM 38 and operates to shift the transmission 26 between the various transmission modes. In the event of a loss of electrical power in the vehicle 10, however, the transmission 26 can be actuated manually between the park position and a non-park position (e.g., neutral, reverse, or drive) via a shift lever assembly 42 (FIG. 3), or another suitable mechanism that is coupled to the transmission 26 for the purpose of releasing the transmission 26 from the park position (e.g., releasing a park pawl 44 of the transmission).

With reference to FIG. 4, in an illustrative embodiment of the shift lever assembly 42, a shift lever 46 is pivotably connected to the transmission 26 so that rotation of the shift lever 46 moves the park pawl 44 (FIG. 2) to shift the transmission 26 into and out of park. To move the park pawl 44, the shift lever 46 may be coupled to a shaft 48 (also shown in FIG. 2) that extends into the transmission 26 and is connected to the park pawl 44. The shift lever 46 is coupled to and driven for rotation by a cable 50. The cable 50 may include a wire 56 received within and movable relative to a conduit 52, and may be a so-called push-pull or Bowden cable.

Figure 15:
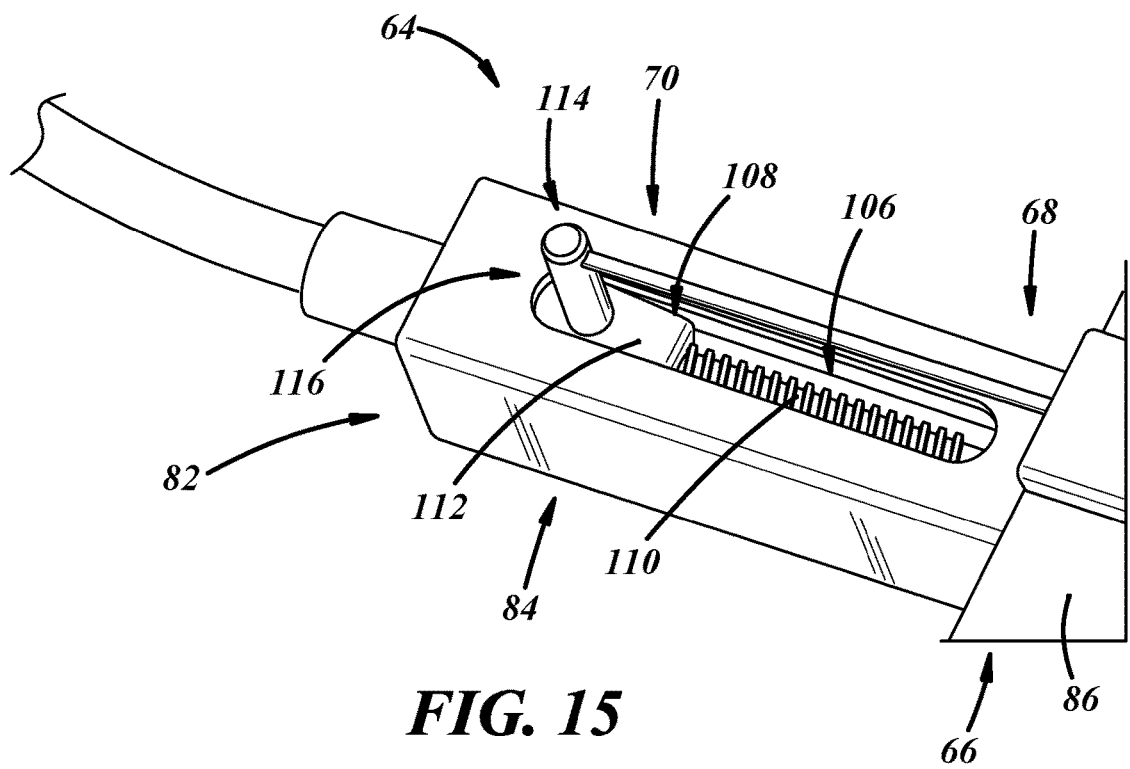
FIG. 15 is a perspective view of an actuator of the park release assembly shown in a stored position.

In more detail, the cable wire 56 is connected at a first end 58 to the shift lever 46 and at a second end 60 to a manual park release assembly 64, as described in more detail below, so that actuation of the park release assembly 64 drives the shift lever 46 via the cable. As the park release assembly 64 is actuated, the wire 56 slides within and relative to the conduit 52 that extends at least part of the distance between the first end 58 and the second end 60 of the wire 56. The conduit 52 is connected at one location to a bracket 54 that may be connected to the transmission housing 32, as shown in FIGS. 3 and 4, and the conduit 52 is connected at a second location to a housing of the park release assembly 64, as shown in FIG. 15. So arranged, the conduit 52 is fixed in at least two locations and does not move as the wire 56 moves within the conduit 52.

Figure 5:
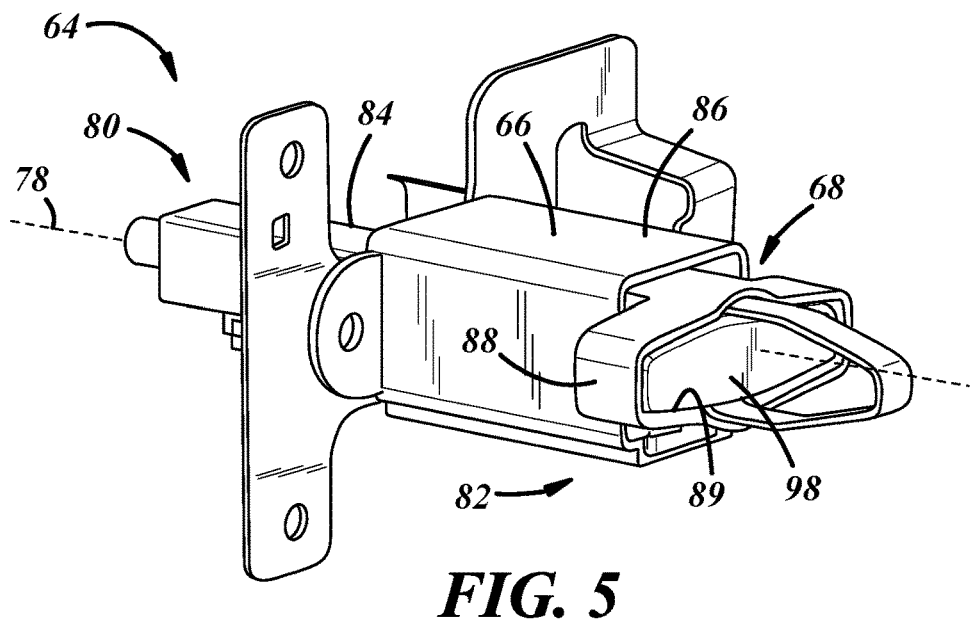
FIG. 5 is a perspective view of the park release assembly.

With reference to FIGS. 3 and 5, the vehicle 10 further includes the manual park release assembly 64 for manually moving the shift lever 46 from its park position to the non-park position in the event of a loss of electrical power in the vehicle 10. In other words, the park release assembly 64 is configured to actuate the shift lever assembly 42 between the park and the non-park position so that the transmission output shaft 30 can freely rotate to facilitate moving or towing the vehicle 10. FIG. 5 shows the park release assembly 64 comprising a housing 66 which at least partially encloses a handle 68 and an actuator 70 (FIG. 15) that is coupled to the handle 68.

Figure 6:
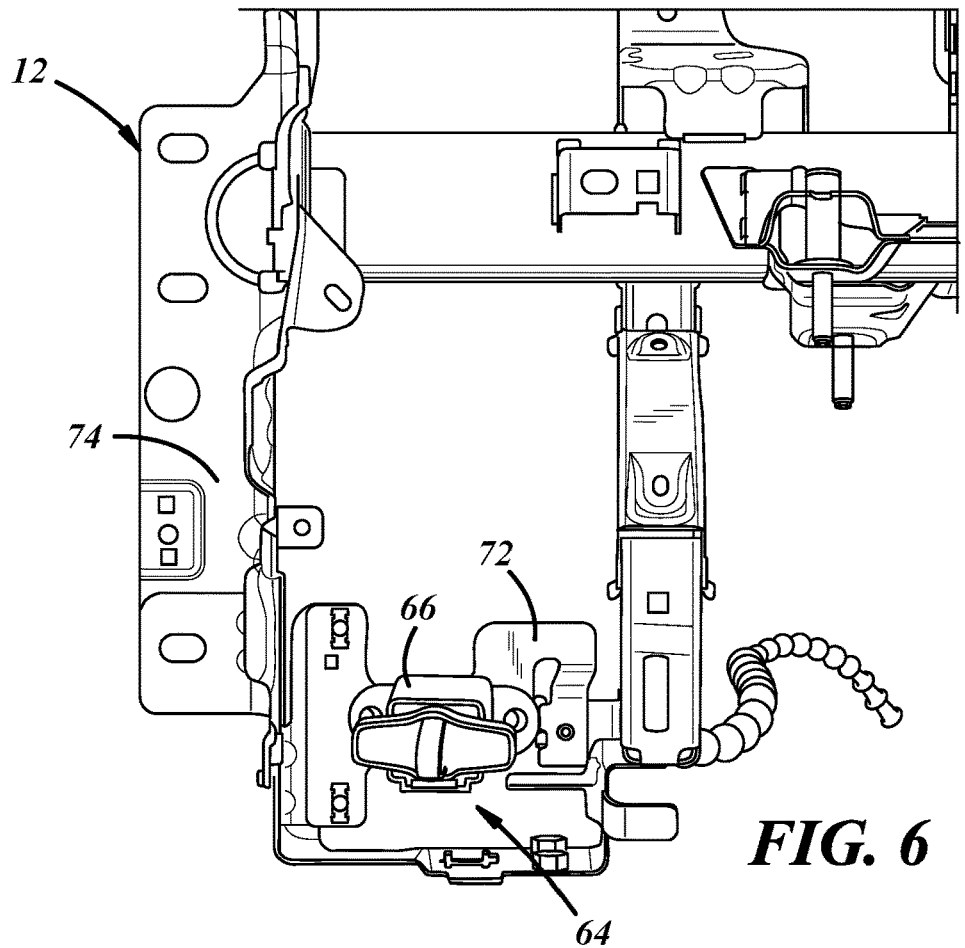
FIG. 6 is a front view of the park release assembly coupled to the vehicle body.
Figure 7:
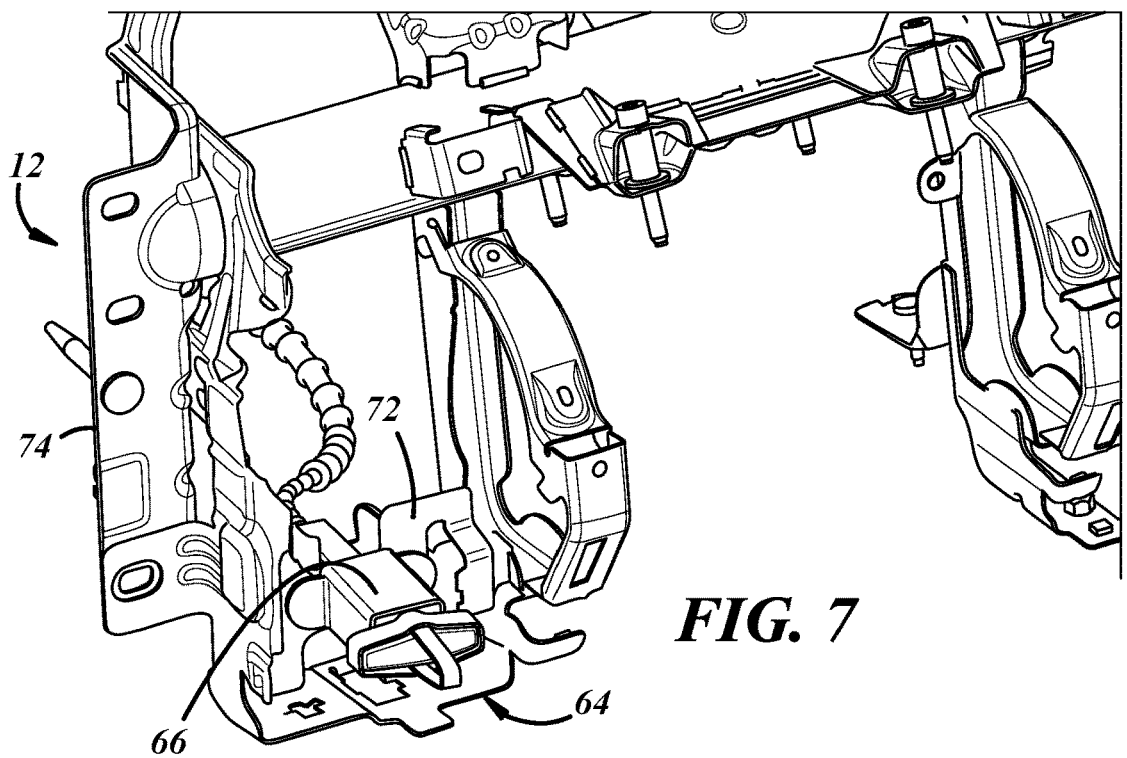
FIG. 7 is a perspective view of the park release assembly coupled to the vehicle body.

The housing 66 may be made of a rigid or semi-rigid material such as plastic or steel and, as shown in FIGS. 6 and 7, is coupled to the vehicle body 12 by a bracket 72 or any other suitable structure capable of coupling the housing 66 to the vehicle body 12. In the example shown, the housing 66 and bracket 72 are connected to a support structure 74 for a vehicle instrument panel so that the handle 68 of the park release assembly 64 is accessible from the passenger compartment 18 of the vehicle 10. The park release assembly 64 could be located elsewhere, as desired. For instance, the park release assembly 64 may be mounted or positioned such that it can be accessed by a user from a portion of the exterior 20 of the vehicle 10, such as beneath a hood 76 (FIG. 1) of the vehicle 10.

With reference again to FIG. 5, the housing 66 extends along a longitudinal axis 78 between a first end 80 and a second end 82. The housing 66 comprises an inner cavity 84 extending along the longitudinal axis 78 from the first end 80 and an outer cavity 86 extending longitudinally between the inner cavity 84 and the second end 82. The inner cavity 84 and the outer cavity 86 are in communication with each other. The handle 68 may be located within the outer cavity 86 and maybe coupled to the actuator 70 that is within the inner cavity 84.

Figure 8:
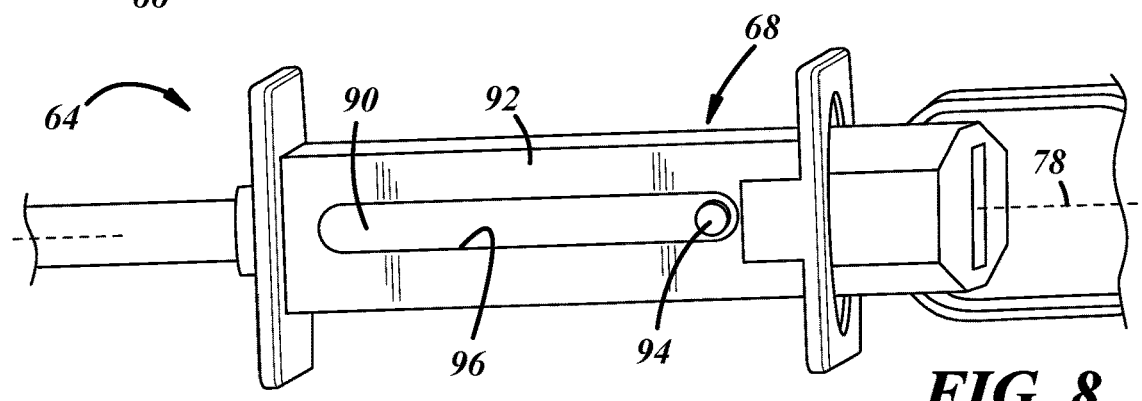
FIG. 8 is a side view of a handle of the park release assembly shown in a stored position.
Figure 9:
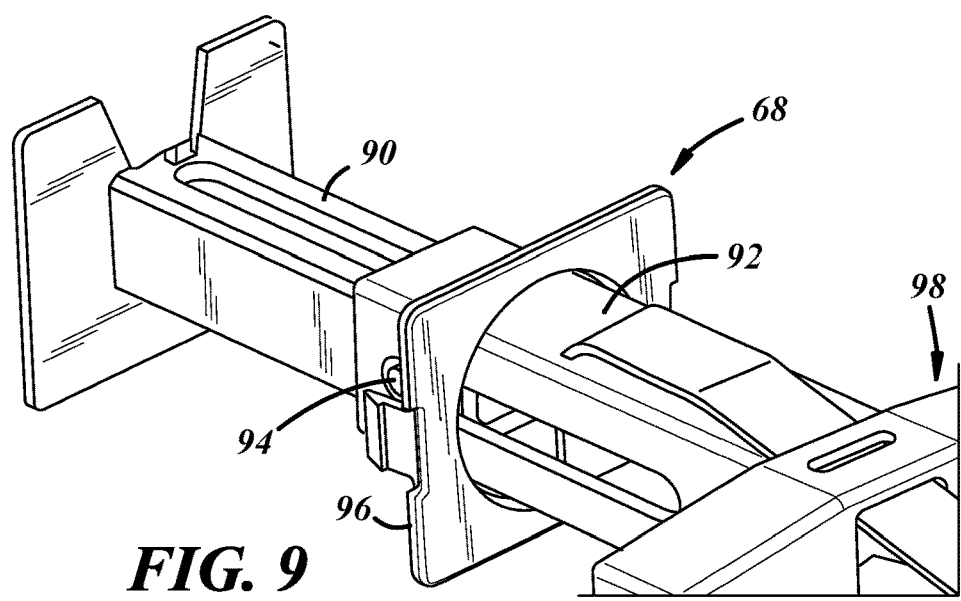
FIG. 9 is perspective view of the handle of the park release assembly shown in a deployed position.

As shown in FIGS. 8 and 9, the handle 68 of the park release assembly 64 is movable relative to the housing 66 along the longitudinal axis 78 between a stored position (FIG. 8) and a deployed position (FIG. 9). In at least some implementations, in the stored position (FIG. 8), the handle 68 is restricted from rotating about the longitudinal axis 78, but can rotate about the longitudinal axis 78 in the deployed position (FIG. 9). To ensure that the handle 68 does not rotate inadvertently (e.g., due to vehicle vibration during road travel) or by a user in the stored position, the housing 66 may further include a handle dock 88 (FIG. 5) defined by or including a cavity 89 that may be complementary in shape to the exterior of the handle 68 and configured to receive a portion of the handle 68, so as to restrict access to the handle 68 and prevent rotation of the handle 68 about the longitudinal axis 78.

As shown in FIGS. 8 and 9, the handle 68 includes a first or inner member 90 and a second or outer member 92. The outer member 92 is coupled to the inner member 90 such that the outer member 92 is slidable relative to the inner member 90 along the longitudinal axis 78 so that the outer member 92 may be withdrawn from the outer cavity 86 and exposed for use by a person. The members 90, 92 are also arranged so that there is little to no relative rotation between the inner member 90 and the outer member 92. In other words, the inner member 90 and outer member 92 are configured to rotate about the longitudinal axis 78 together. As shown in the present illustrative embodiment, the inner member 90 includes pins 94 that extend outwardly and orthogonally to the longitudinal axis 78 and the outer member 92 includes channels 96 into or through which the pins 94 extend so that the outer member 92 is slidably carried on the inner member 90. When the handle 68 is rotated, the outer member 92 bears on the pins 94 of the inner member 90 and the inner and outer members 90, 92 rotate together. Note, however, additional embodiments may include different arrangements of channels, grooves, tracks and/or pins on the inner and outer members 90, 92 to enable slidable relative movement and to ensure that the inner and outer members 90, 92 of the handle 68 rotate together.

Figure 10:
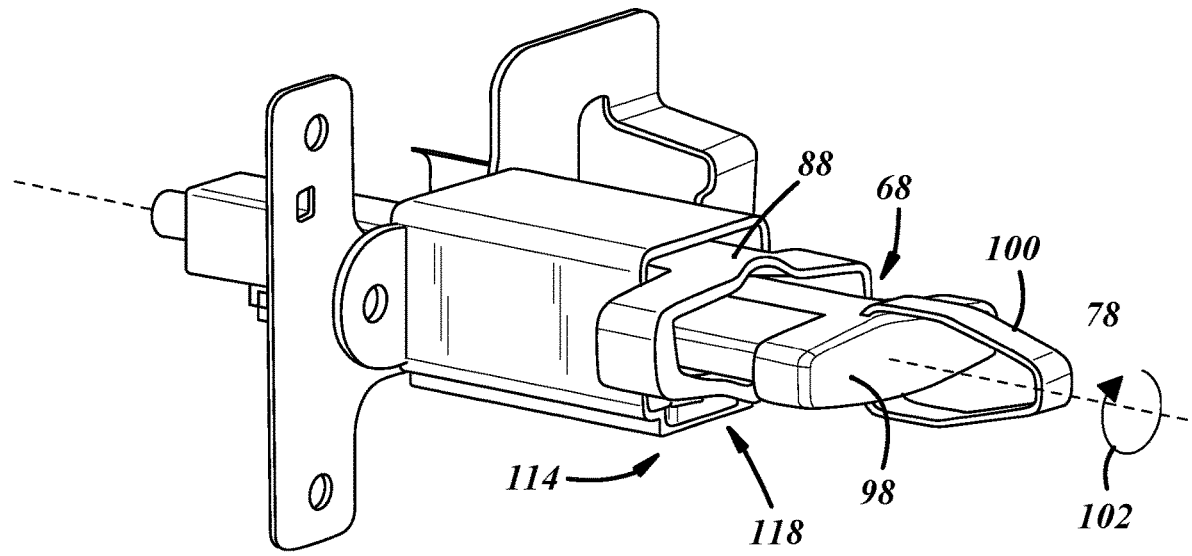
FIG. 10 is a perspective view of the park release assembly with the handle in a deployed position and an indicator retracted inside of the housing.
Figure 11:
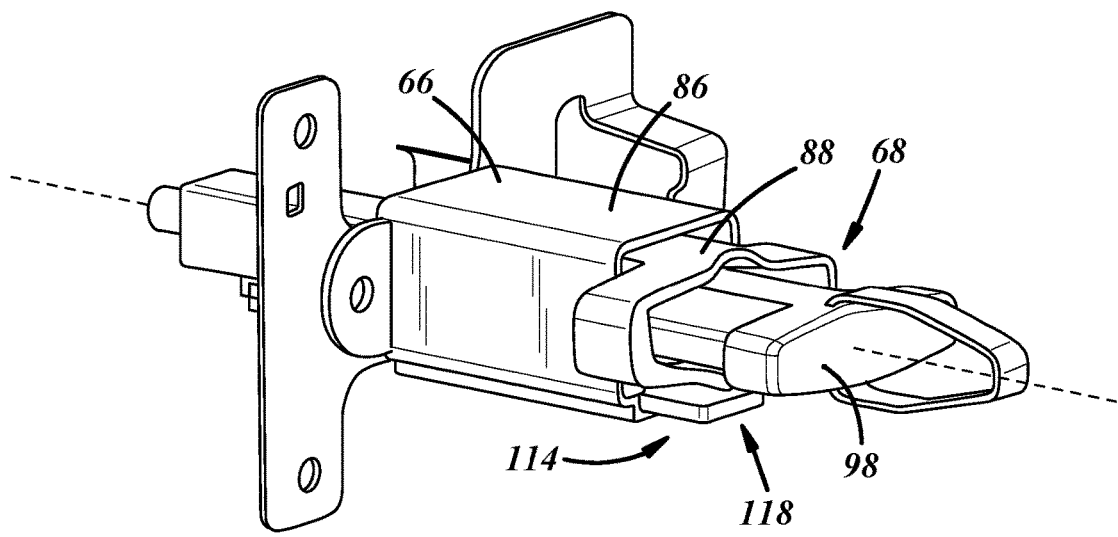
FIG. 11 is a perspective view of the park release assembly with the handle in a deployed position and the indicator protruding from the housing.

With reference to FIGS. 10 and 11, the handle 68 may include an enlarged handle end 98 coupled to the outer member 92 and arranged to be grasped by a user and to enable an increased rotational force or torque to be provided by the user to the handle 68. The handle end 98 is shown as being generally rectangular and with the outer member 92 defining a generally T-shaped handle. The handle end 98 may be coupled to or formed in the same piece of material as the outer member 92. When the handle 68 is in the stored position, the handle end 98 is received in the dock 88 as shown in FIG. 5, and the handle end 98 is outside of the dock 88 when the handle is in the deployed position as shown in FIGS. 10 and 11. As shown in FIG. 10, to facilitate removing the handle 68 from the dock 88 and moving the handle 68 to the deployed position, a tether or loop 100 may be attached to the handle 68 and can be grabbed by a user to actuate or deploy the handle 68 in the axial direction. When the handle 68 is in the deployed position, the handle 68 can be gripped by a user or an operator, for example, and rotated about the axis 78 in a first direction (e.g., clockwise) to actuate the actuator 70 of the park release assembly 64.

Figure 12:
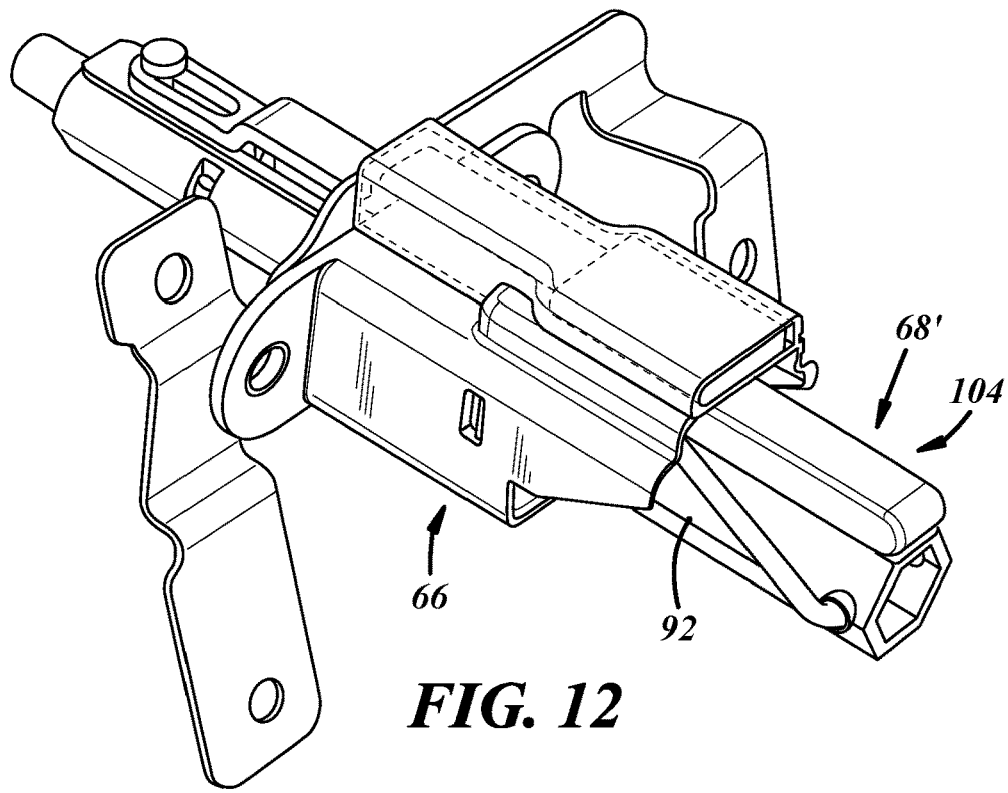
FIG. 12 is a perspective view of another embodiment of a park release assembly including a housing, a handle, and an actuator.
Figure 13:
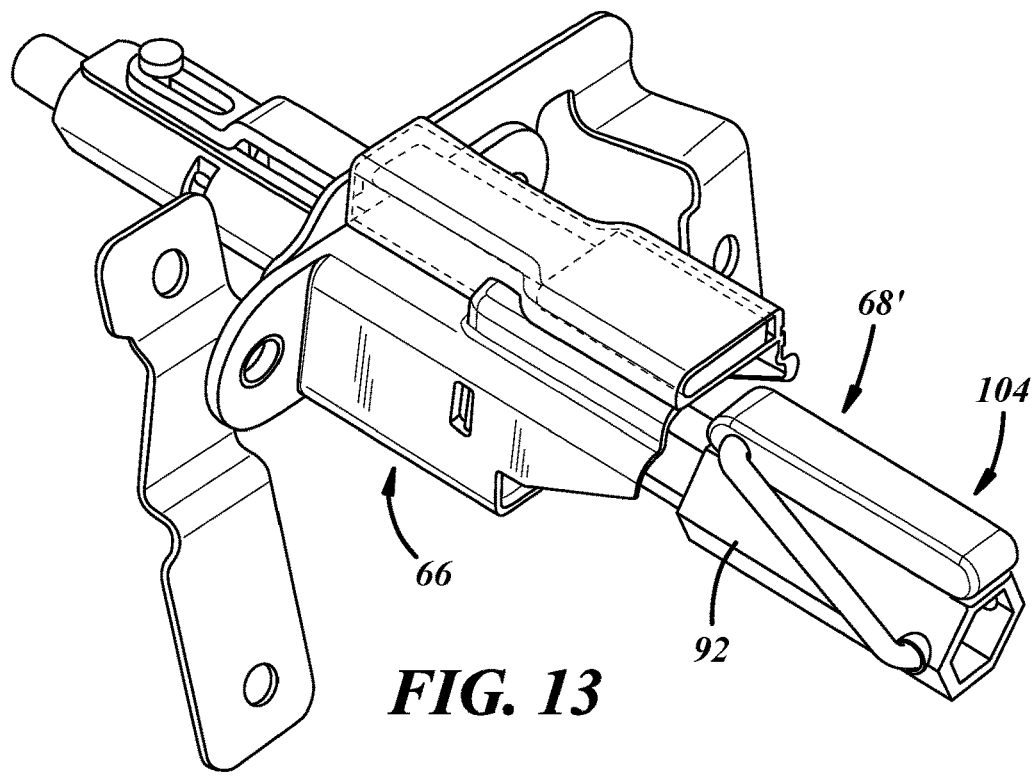
FIG. 13 is a perspective view of the park release assembly of FIG. 13 with the handle in a deployed position and a lever in a collapsed or retracted position.
Figure 14:
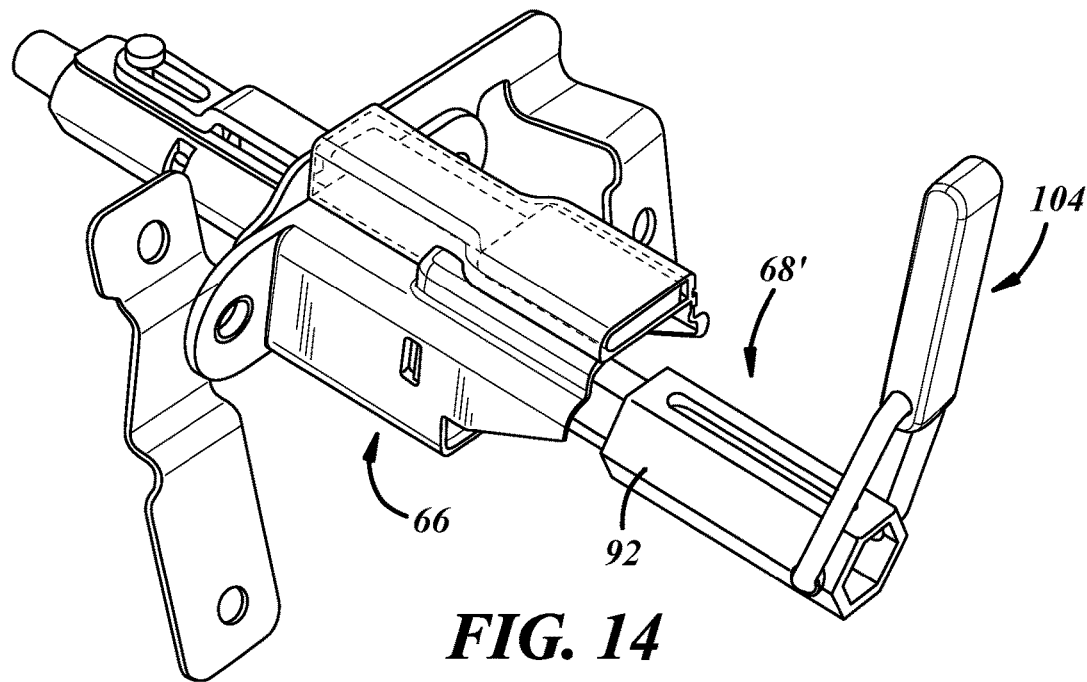
FIG. 14 is a perspective view of the park release assembly of FIG. 13 with the handle in the deployed position and the lever in an extended position.

Another embodiment of a handle 68' is shown in FIG. 12. This handle 68' includes a collapsible lever 104 coupled to the outer member 92 of the handle 68' and configured to be stored at least partially within the housing 66 in the stored position (FIG. 12) and extend radially outwardly from the outer member 92 of the handle in the deployed position (FIG. 14). As shown in FIG. 13, the collapsible lever 104 is hingedly attached to the outer member 92 such that when it is collapsed and stored within the housing 66, such as in a similarly or complementarily shaped cavity 105 (FIG. 12), the housing 66 prevents the handle 68' from being rotated. To deploy the collapsible lever 104 from the housing 66, a user can actuate the outer member 92 of the handle 68' so as to move the outer member 92 axially away from the housing 66 which frees the collapsible lever 104 from any rotational restriction provided by the housing 66, as shown in FIG. 13. When the outer member 92 of the handle 68' is in the deployed position, the collapsible lever can be gripped by a user or an operator, for example, and rotated in the first direction (e.g., clockwise) to actuate the actuator 70 of the park release assembly 64.

With reference again to FIG. 15, the actuator 70 of the park release assembly 64 is coupled to the handle 68 and disposed in the inner cavity 84 of the housing 66. In the present illustrative embodiment, the actuator 70 comprises a first portion 106 coupled to the handle 68, and a second portion 108 coupled to the first portion 106. The actuator 70 is configured so that rotation of the handle 68 causes rotation of the first portion 106 of the actuator 70 which in turn causes axial movement of the second portion 108 of the actuator 70. Thus, the actuator 70 converts rotary motion to linear motion. In at least some implementations, and as shown in FIG. 15, the first portion 106 includes or is defined by a threaded shaft 110 that is coupled to the inner member 90 of the handle 68, and the second portion 108 includes or is defined by a nut 112 that is threaded on the threaded shaft 110 and arranged within the inner cavity 84 of the housing 66. The nut 112 is constrained by the inner cavity 84 of the housing 66 so that the nut 112 does not rotate with the threaded shaft 110 and instead moves axially along the threaded shaft 110 as driven by the threads on the shaft 110 and the nut 112. In at least some implementations, the inner cavity 84 and nut 112 are not circular, and may each include at least one flat surface the interaction of which prevent rotation of the nut 112 within the inner cavity 84 and guide the nut 112 for linear movement along the threaded shaft 110. In the example shown, the periphery of the nut 112 is generally rectangular in cross-section and the inner cavity 84 is complementarily shaped providing multiple, overlapped flat surfaces that constrain the nut 112 to linear/axial movement within the inner cavity 84.

The nut 112 is connected to the wire 56 of the cable 50 so that linear movement of the nut 112 causes the wire 56 to slide within and relative to the outer conduit 52. Movement of the wire 56 causes rotation of the shift lever 46, as noted above, and, for example, can shift the transmission 26 out of park by releasing the park pawl 44. So arranged, rotation of the handle 68 drives the wire 56 to move the shift lever 46.

With reference to FIG. 15, the park release assembly 64 may further include an indicator 114 for alerting a user or an operator that the park release assembly 64 is in the park position or the non-park position. The indicator includes a rear end 116 and a front end 118 (FIG. 10) and may be coupled to and is movable with the actuator 70. As shown in FIG. 15, the rear end 116 of the indicator 114 may be coupled to the second portion 108 of the actuator (e.g., the nut 112) and, as shown in FIG. 10, the front end 118 may extend longitudinally through a portion of the outer cavity 86 of the housing 66. When the handle 68 is deployed and rotated in the first direction about the longitudinal axis 78, the indicator 114 is driven relative to the housing 66 by movement of the second portion 108 of the actuator 70 so that the front end 118 of the indicator 114 increasingly protrudes out of the outer cavity 86 of the housing 66, as shown in FIG. 11. When the indicator 114 protrudes out of the outer cavity 86 by a threshold amount, the transmission 26 is in the non-park position. The indicator 114 may include, on a surface visible when protruded out of the outer cavity 86, one or more markings/indicia that indicate that park release assembly 64 has been actuated sufficient to shift the transmission 26 out of park, so that a user can readily determine when that has occurred. Rotation of the handle 68 in a second direction (e.g., counterclockwise or opposite the first direction) about the longitudinal axis 78 may retract the indicator 114 into the housing 66 along the longitudinal axis 78, providing an indication when fully retracted that the transmission 26 is in the park position.

In operation, when the handle 68 is deployed and rotated in the first direction about the longitudinal axis 78, the first portion 106 of the actuator 70 rotates relative to the second portion 108 of the actuator 70 which moves toward the second end 82 of the housing 66. Also, when the handle 68 is deployed and rotated in the second direction about the longitudinal axis 78, the second portion 108 of the actuator moves axially along the first portion 106 of the actuator 70 and toward the first end 80 of the housing 66. In either scenario, some level of force is required by a user or an operator to rotate the handle 68 and actuate the park release assembly 64. In at least one embodiment, the desirable amount of force necessary to grip and rotate the handle 68 is less than 90 N, or an amount where a user may manually grip and rotate the handle 68 without the need for additional tools. Some embodiments of the park release assembly 64 may require more or less force to actuate the assembly, and the handle 68 can be designed to provide sufficient leverage to enable most users to be able to rotate the handle 68 and actuate the park release assembly 64.

What is claimed is:

1. A manual park release assembly, comprising:
a housing extending along a longitudinal axis between a first end and a second end, the housing having an inner cavity extending from the first end to an outer cavity that is open to the second end;
a handle disposed at least partially in the outer cavity of the housing, the handle having an inner member and an outer member that is slidable relative to the inner member, and the outer member of the handle being movable relative to both the housing and the inner member of the handle along the longitudinal axis between a stored position and a deployed position, wherein the outer member is located at least partially inside the outer cavity in the stored positions and the outer member is located outside of the outer cavity in the deployed position and the handle is rotatable relative to the longitudinal axis when the handle is in the deployed position; and
an actuator coupled to the handle and received within the inner cavity, the actuator having a first portion coupled to the inner member of the handle for rotation with the handle and a second portion coupled to the first portion and movable axially in response to rotation of the first portion.

2. The manual park release assembly of claim 1 wherein when the handle is in the deployed position, the inner member and outer member rotate together.

3. The manual park release assembly of claim 1 wherein the inner member includes pins that extend outwardly and orthogonally to the longitudinal axis, and the outer member includes channels into or through which the pins extend.

4. The manual park release assembly of claim 1 wherein the first portion of the actuator is a threaded shaft and the second portion is a nut which is threaded on the threaded shaft.

5. The manual park release assembly of claim 4 wherein the nut is received within the inner cavity, and the inner cavity and the nut are not circular, and each of inner cavity and the nut include at least one flat surface the interaction of which prevent rotation of the nut within the housing and guide the nut for linear movement along the threaded shaft.

6. The manual park release assembly of claim 1 wherein when the handle is deployed and rotated in a first direction about the longitudinal axis, the first portion of the actuator rotates relative to the second portion of the actuator which moves toward the second end of the housing.

7. The manual park release assembly of claim 1 wherein when the handle is deployed and rotated in a second direction about the longitudinal axis, the second portion of the actuator moves axially along the first portion of the actuator and toward the first end of the housing.

8. A manual park release assembly, comprising:
a housing extending along a longitudinal axis between a first end and a second end;
a handle disposed at least partially in the housing, the handle being deployable relative to the housing along the longitudinal axis between a stored position and a deployed position, and the handle being rotatable relative to the longitudinal axis when the handle is in the deployed position;
an actuator coupled to the handle, the actuator having a first portion coupled to the handle for rotation with the handle and a second portion coupled to the first portion and movable axially in response to rotation of the first portion; and an indicator including a rear end coupled to the second portion of the actuator and a front end extending longitudinally to the second end of the housing, wherein when the handle is in the deployed position and rotated in a first direction about the longitudinal axis the indicator is driven axially and increasingly protrudes out of the second end of the housing.

9. A vehicle, comprising:
a vehicle body;
a transmission coupled to the vehicle body, the transmission including a shift lever that is driven to change the gear setting of the transmission;
a housing coupled to the vehicle body and having a longitudinal axis, an inner cavity and an outer cavity that is open to the inner cavity;
a handle at least partially disposed in the outer cavity of the housing, the handle being movable along the longitudinal axis between a stored position and a deployed position, more of the handle is received within the outer cavity in the stored position than in the deployed position, and the handle is rotatable about the longitudinal axis in the deployed position but not in the stored position;

an actuator disposed in the inner cavity of the housing, the actuator having a first portion coupled to the handle for rotation with the handle and a second portion coupled to the first portion and movable axially in response to rotation of the first portion; and a cable connected to the second portion of the actuator and to the shift lever so that movement of the second portion of the actuator is transmitted to the shift lever via the cable, to move the shift lever.

10. The vehicle of claim 9 wherein the housing is coupled to the vehicle body by a bracket.

11. The vehicle of claim 10 wherein the housing and the bracket are connected to a support structure for a vehicle instrument panel.

12. The vehicle of claim 9 wherein the housing further includes a handle dock and the handle includes an enlarged handle end that is received in the handle dock when the handle is in the stored position.

13. The vehicle of claim 9 wherein the handle includes a collapsible lever coupled to the handle and is configured to be stored at least partially within the housing in the stored position.

14. The vehicle of claim 9 wherein the cable includes a wire that has a first end and a second end, and that is received within a conduit that extends at least part of the distance between the first end and the second end.

15. The vehicle of claim 14 wherein the first end of the wire is directly coupled to the shift lever and the second end of the wire is coupled to the second portion of the actuator.

16. The vehicle of claim 9 further including an indicator including a rear end coupled to the second portion of the actuator and a front end extending longitudinally through the housing, wherein when the handle is in the deployed position and rotated in a first direction about the longitudinal axis the indicator is driven axially along the longitudinal axis and increasingly protrudes out of the housing.

17. The vehicle of claim 9 wherein the outer cavity and handle are configured so that the handle cannot rotate about the longitudinal axis when the handle is in the stored position.

18. The vehicle of claim 17 wherein the handle is T-shaped and has an enlarged handle end and, when the handle is in the stored position, the handle end is received within a complementarily shaped cavity of the housing.

* * * * *